US011744248B2

(12) United States Patent
Smyth et al.

(10) Patent No.: US 11,744,248 B2
(45) Date of Patent: Sep. 5, 2023

(54) DISINFECTANT COMPOSITION FOR CONTROL OF CLOSTRIDIUM DIFFICILE SPORE

(71) Applicants: Bruce Smyth, Byron Bay (AU); Michael Bralkowski, Lexington, NC (US)

(72) Inventors: Bruce Smyth, Byron Bay (AU); Michael Bralkowski, Lexington, NC (US)

(73) Assignee: Enviro Specialty Chemicals Inc., Lexington, NC (US)

( * ) Notice: Subject to any disclaimer, the term of this patent is extended or adjusted under 35 U.S.C. 154(b) by 578 days.

(21) Appl. No.: 16/104,916

(22) Filed: Aug. 19, 2018

(65) Prior Publication Data

US 2019/0053494 A1    Feb. 21, 2019

Related U.S. Application Data

(60) Provisional application No. 62/547,844, filed on Aug. 20, 2017.

(51) Int. Cl.
*A61L 2/18* (2006.01)
*A01N 55/02* (2006.01)
(Continued)

(52) U.S. Cl.
CPC ............. *A01N 55/02* (2013.01); *A01N 33/04* (2013.01); *A01N 33/12* (2013.01); *A01N 47/44* (2013.01)

(58) Field of Classification Search
CPC ........ A01N 33/12; A01N 25/10; A01N 25/30; A01N 47/44; A01N 55/02
See application file for complete search history.

(56) References Cited

U.S. PATENT DOCUMENTS

| 2008/0286225 A1* | 11/2008 | Schonemyr | ........ | C08G 73/0226 |
| | | | | 424/78.32 |
| 2012/0148751 A1* | 6/2012 | Herdt | ..................... | A61P 31/04 |
| | | | | 427/299 |

FOREIGN PATENT DOCUMENTS

WO    WO-2015139085 A1 *    9/2015    ........... A61Q 17/005

OTHER PUBLICATIONS

R.J. Lambert et al., "Weak-acid preservatives: modelling microbial inhibition and response," Journal of Applied Microbiology 1999, 86, 157-164.*

(Continued)

*Primary Examiner* — Brian Gulledge
(74) *Attorney, Agent, or Firm* — Honigman LLP

(57) ABSTRACT

A composition and method for inducing and inflicting damage to cell membranes of microorganism by inducing changes in membrane permeability caused by polycation-induced membrane pores. The control of *Clostridium difficile* spores with an efficacy of 99.99% on hard surfaces is provided. The invention includes the application of an evaporation-induced self-assembly, surfactant-mediated synthesis or self-condensing polymer, which forms a film which is both flexible on the surface as a nano-polymeric coating and with refractive index yielding a transparent coating. The polymeric matrix includes various biocidal polymeric cationic quaternary salts, one being a silyl quaternary having a kinetic zeta potential to disrupt bacterial spores functions. The polymeric matrix consist of multiple small molecule biocides as well as polymerics biocide combinations not otherwise seen to develop an surface topography of peaks and troughs in the nano range to resist bacterial adhesion factors and subsequent biofilm formation. The surfactants induce self-assembly film topography.

17 Claims, 1 Drawing Sheet

Tetrahedral sheet ⟶

Octahedral sheet ⟶

Tetrahedral sheet ⟶

Tetrahedral sheet ⟶

● Si
● OH
○ O
● Al, Mg

● Cationic species
● $H_2O$ molecules

(51) Int. Cl.
*A01N 33/04* (2006.01)
*A01N 47/44* (2006.01)
*A01N 33/12* (2006.01)

(56) References Cited

OTHER PUBLICATIONS

"1,2-Bis(triethoxysilyl)ethane," <https://www.ahelite.com/1-2-Bis-triethoxysilyl-ethane-pd036624.html>, published Feb. 28, 2016, pp. 1-4.*

* cited by examiner

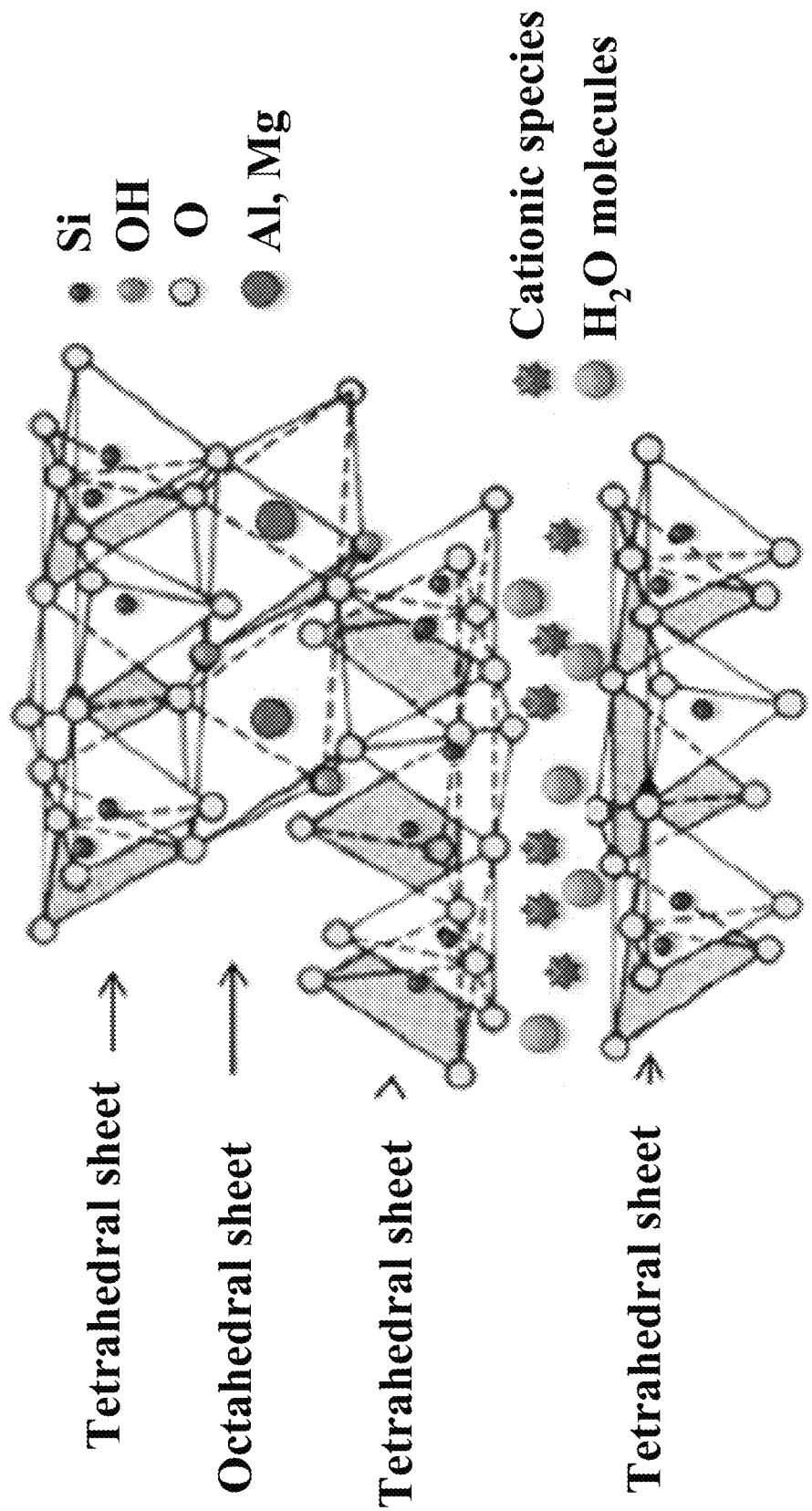

DISINFECTANT COMPOSITION FOR CONTROL OF CLOSTRIDIUM DIFFICILE SPORE

This application claims the priority benefit under 35 U.S.C. section 119 of U.S. Provisional Patent Application No. 62/547,844 entitled "Disinfectant Composition For Control Of *Clostridium Difficile* Spore" filed on Aug. 20, 2017; and which is in its entirety herein incorporated by reference.

FIELD OF THE INVENTION

The bacteria *Paenibacillus polymyxa* produces the antibiotic colistin or Polymixin E. Colistin is the strongest antibiotic by nature and the one of last resort, as it can damage the kidneys and nerves. The World Health Organization and the Center for Disease Control unfortunately have confirmed superbugs resistant to Colistin. Colistin is a polycationic peptide $C_{52}H_{98}N_{16}O_{13}$ with a molecular mass of 1155 gm/mol. Colistin's cationic regions interact with the bacterial outer membrane by displacing magnesium and calcium, the bacterial counter ions in the lipopolysaccharide.

In addition to superbugs, the incidents of bacterial spore outbreaks such as *Clostridium difficile* continues to increase in hospitals and adult care centers. Spores are extremely difficult to destroy with non-hazardous chemicals.

To counter the diversity of spores and superbugs in a hospital environment or workplaces, a mixture or cocktail of antimicrobials is an alternative to treat surfaces. Microorganisms are ubiquitous within the workplace structure, from ceiling to floor, from walls to doors, and any equipment or persons therein. A safe low dosage mixture of compounds which does not destroy or corrode equipment, metal, plastic, textiles or electronics is sorely needed. A safe low dosage mixture of compounds which adheres to the hard or porous surfaces for extended time and is efficacious is sorely needed in the anti-infective field.

The present invention utilizes a mixture of cationic biocides and non-ionic surfactants that includes a condensation polymer of poly 1-Octadecanaminium NN Dimethyl N (3 Trihydroxysilyl) propyl chloride as the base film on substrates and further binds it to substrates in combination with its monomer 1-Octadecanaminium NN Dimethyl N (3-Trimethoxylsilyl) propyl chloride or 1-Octadecanaminium NN Dimethyl N (3-Triethoxylsilyl) propyl chloride or 1-Dodecanaminium N,N Dimethyl N (3-Trimethoxylsilyl) propyl chloride and 1,2-Bis(Triethoxysilyl) ethane to form a self-assembled evaporative nano cationic architectural film. The trihydroxy, trimethoxy and triethoxy groups are the functional groups that adhere to substrates encasing the substrates like a glove.

BACKGROUND OF THE INVENTION

In the United States compounds used to disrupt, mitigate, kill or prevent microorganisms in the environment (other than on or in animals or humans) are regulated by the Environmental Protection Agency EPA under the "FIFRA" act. The EPA listing of chemistries includes Calcium and Sodium Hypochlorite, peroxides, heavy metals namely Zinc, Silver and Copper, Quaternary ammonium salts, Gluteraldehyde, Formaldehyde and Isothiozolinones, Dithiocarbamates, Methylene-bis thiocyanate and ethylene oxide gas.

In U.S. Pat. No. 5,814,591 Mills et al states that the use of EDTA and a quaternary ammonium salt with surfactant can remove soil and be a hard surface disinfectant. Mills does not teach of persistent film formers on the surfaces.

In U.S. Pat. No. 6,994,890 Ohlhausen et al reveal the use of an organosilane quaternary compound and hydrogen peroxide in a cleaning and multifunctional coating composition. No mention of effecting spores is discussed.

In US 2006/0193816 A Elfersey teaches the use of a mixture of silane quaternary ammonium monomers to form a film on a hard surface or textile to effect bacteria. He combines the formulation with alkyl dimethyl benzyl quaternary ammonium salt and hydrogen peroxide. He does add Polyhexanide (polyhexamethylene biguanide, PHMB) which is instantly effective on *Pseudomonas aeruginosa* but does not define any formulation to affect the architecture of the surface as to increase adhesion of the polymer or remove any of bacteria or deplete biofilms.

In US 2010/0279906 Schwarz describes an antimicrobial composition consisting of mixed quaternary ammonium compounds mixed with silane fluids. He does not discuss the silane quaternary ammonium salts.

In US 2014/0011766 Krafft teaches a 1.5% active organosilane in ethanol as being a hard surface disinfectant. Krafft doesn't mention the flammability of a 50% ethanol hard surface disinfectant in comparison to a water based non-flammable product. Kraft doesn't teach that the product can be nearly alcohol free (<1.0%) and be efficacious.

In US 2017/0166755 Moros et al describe the making of an organosilane and electrostatically spraying onto surfaces, allowing to dry, followed by electrostatically spraying peroxo-titanium acid solution with a peroxide modified anatase solution as an overspray to prevent microorganism growth on surfaces in a hospital setting. Moros doesn't teach that it can be used for as a cleaning aid to reduce microbes or on wipes to disinfect hard surfaces.

SUMMARY OF THE INVENTION

The invention provides an antibacterial and antiviral composition for inducing and inflicting damage to cell membranes of said infectious microorganism by inducing changes in membrane permeability, said composition comprising effective amounts of a quaternary ammonium polymeric film former; a coupling agent; one or more antimicrobial polymeric macromolecules; one or more antiviral polymeric macromolecules; an antimicrobial small molecule; one or more surfactants for micellular dispersions and self assembly properties; a chelating agent, a preservative and optionally a fragrance.

BRIEF DESCRIPTION OF THE FIGURES

FIG. 1 illustrates the structure of a clay stabilizer that shows that water trapped within the clay matrix provides for a water bridge for the trihydroxysilyl stability and freeze point reduction.

DETAILED DESCRIPTION OF THE INVENTION

Bacteria survive most disinfectants more so when the bacteria are sheltered within a biofilm. During this time bacteria survive and are competent which defines a cannibalistic state of consuming parts (DNA) of other bacteria. It is here that horizontal gene transfer can occur. This is the theory of evolving and becoming resistant to disinfectants and antibiotics. Recently *Enterococcus faecisum* has become resistant to isopropanol and *Burkholderia cepacia* has grown in antimicrobials with Benzalkonium chloride and Chlorhexidine gluconate 2%. There is a long felt need to have more diverse systems of 3 or more actives to counter bacterial resistance as well as non migratory polymeric antimicrobial actives.

The invention provides compositions that include one or more of the followings:
i) an alkoxy silyl ammonium compound monomer,
ii) an alkoxy silyl ammonium compound polymer,
iii) an advanced 1,2-Bis(Triethoxysilyl) ethane coupling agent,
iii) a polymeric biguanide; and
iv) a polymeric stabilizer such as a smectite, bentonite or filler such as hydroxyethyl cellulose or other hydroxyalkyl celluloses.

In some embodiments, the alkoxy silyl ammonium polymer and monomer combination film-forming agents is an alkoxy silyl quaternary ammonium film forming agent. Alkoxy silyl quaternary ammonium film forming agents are also known in the art as organosilicon quaternary ammonium film forming compounds.

In some embodiments, the alkoxy silyl ammonium film-forming agent is a compound of formula.

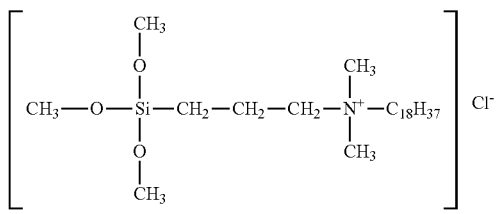

Other film forming agents include compounds corresponding to the following formula $R_1,R_2,R_3$—Si—$CH_2CH_2CH_2$—$N^+$—$R_YR_XR_Z$ $W^-$ wherein $W^-$ is a Cl, Br; F or I, more in particular $Cl^-$ $R_1,R_2,R_3$ are $CH_3O$ or $CH_3CH_2O$ groups. In particular embodiments, one or more of the following may be suitable $R_1,R_2,R_3$ are a hydrogen, hydroxy, alkoxy such as methoxy or ethoxy, alkyl such as methyl or ethyl; $R_Y$ is a $C_1$-$C_5$ alkyl group preferably a $CH_3$ group; and $R_X$ is $C_1$-$C_5$ alkyl group preferably a $CH_3$ group; and $R_Z$ is a $C_7$-$C_{18}$ alkyl or a mixture of various alkyl species but predominately $C_{18}$ alkyl or $C_{12}$ alkyl or both, more particularly $C_{18}$ alkyl.

In particular embodiments, the alkoxy silyl ammonium film-forming compound of formula (I) is selected from the group consisting of: 1-octadecanaminium-N,N-dimethyl-N-[3-trimethoxysilyl(propyl)]chloride, 3-trimethoxysilylpropyl-N,N-dimethyl-N-octadecyl ammonium chloride), 3-triethoxysilylpropyl-N,N-dimethyl-N-octadecyl ammonium chloride, 3-trimethoxysilyl propyl-N,N-dimethyl-N-octyl ammonium chloride, 3-triethoxysilylpropyl-N,N-dimethyl-N-octyl ammonium chloride, 3-triethoxysilylpropyl-N,N-dimethyl-N-isodecyl ammonium chloride, 3-trimethoxysilylpropyl-N,N-dimethyl-N-isodecyl ammonium chloride, 3-trimethyoxysilyl-propyl-N,N-dimethyl-N-decyl ammonium chloride, 3-triethyloxysilylpropyl-N,N-dimethyl-N-decyl ammonium chloride, 3-trimethyoxysilylpropyl-N,N-dimethyl-N-dodecyl ammonium chloride, 3-triethyloxysilylpropyl-N,N-dimethyl-N-dodecyl ammonium chloride, 3-trimethoxy-silylpropyl-N,N-dimethyl-N-tetradecyl ammonium chloride, 3-triethoxysilylpropyl-N,N-di-methyl-N-tetradecyl ammonium chloride, 3-trimethoxysilylpropyl-N,N-dimethyl-N-hexadecyl ammonium chloride, 3-triethoxysilylpropyl-N,N-dimethyl-N-hexadecyl ammonium chloride, 3-trimethoxysilylpropyl-N,N-dimethyl-N-octadecyl ammonium chloride, 3-triethoxysilylpropyl-N,N-dimethyl-N-octadecyl ammonium chloride, 3-trimethoxysilylpropyl-N,N-dimethyl-N-docosyl ammonium chloride, 3-triethoxysilylpropyl-N,N-dimethyl-N-docosyl ammonium chloride, 3-trimethoxysilylpropyl-N,N-dimethyl-N-eicosyl ammonium chloride, 3-triethoxysilyl-propyl-N,N-dimethyl-N-eicosyl ammonium chloride, 3-trimethoxysilylpropyl-N,N-dimethyl-N—$C_{12}$-$C_{16}$ ammonium chloride, where $C_{12}$=65% and $C_{16}$=33%, 3-triethoxysilylpropyl-N,N-dimethyl-N—$C_{12}$-$C_{16}$ ammonium chloride, where $C_{12}$=65% and $C_{16}$=33%, 3-trimethoxy-silylpropyl-N,N-dimethyl-N—$C_{16}$-$C_{22}$ ammonium chloride, where $C_{16}$=16% and $C_{22}$=83%, 3-triethoxysilylpropyl-N,N-dimethyl-N—$C_{16}$-$C_{22}$ ammonium chloride, where $C_{16}$=16% and $C_{22}$=83%, 3-trimethoxysilylpropyl-N,N-dimethyl-N—$C_{14}$-$C_{18}$ ammonium chloride, where $C_{14}$=4%, $C_{16}$=31% and $C_{18}$=64%, 3-triethoxysilylpropyl-N,N-dimethyl-N—$C_{14}$-$C_{18}$ ammonium chloride, where $C_{14}$=4%, $C_{16}$=31% and $C_{18}$=64%, 3-trimethoxysilylpropyl-N,N-dimethyl-N—$C_{12}$-$C_{16}$ ammonium chloride, where $C_{12}$=41%, $C_{14}$=50% and $C_{16}$=9%, 3-triethoxysilylpropyl-N,N-dimethyl-N—$C_{12}$-$C_{16}$ ammonium chloride, where $C_{12}$=41%, $C_{14}$=50% and $C_{16}$=9%, 3-tri-methoxysilylpropyl-N,N-dimethyl-N—$C_{12}$-$C_{18}$ ammonium chloride, where $C_{12}$=49%, $C_{14}$=20%, $C_{16}$=11% and $C_{18}$=10%, and 3-triethoxysilylpropyl-N,N-dimethyl-N—$C_{12}$-$C_{18}$ ammonium chloride*, where $C_{12}$=49%, $C_{14}$=20%, $C_{16}$=11% and $C_{18}$=10%.

The alkoxy silyl ammonium film-forming compound is present in the composition in an amount in the range of 0.1% to 5.0% w/w, especially about 1.0% to 3.0% w/w, more especially about 1.6 to 2.5% w/w of the active in the composition.

It is known that alkoxy silyl quaternary ammonium compounds hydrolyze in water forming the trihydroxy silicon functional group, therefore, for example, 3-trimethoxysilyl-propyl-N,N-dimethyl-N-octadecyl ammonium chloride is hydrolyzed to form as 3-trihydroxy silyl propyl-N,N-dimethyl-N-octadecyl ammonium chloride. The alkyl silyl ammonium compounds are made in ethanol or methanol as a solvent. There is 22% methanol in 1-octadecanaminium-N,N-dimethyl-N-[3-trimethoxysilyl(propyl)] chloride product.

The addition of the polymer from 1-Octadecanaminimum-N, N-Dimethyl-N-[(3-trihydroxysilyl)propyl] chloride couples with the monomer forming high density sites upon drying (film forming) that are closer to the surface than the monomeric condensation polymeric reaction. The topography of the film formed becomes peaks and troughs.

An advancement in binding to substrates is incorporated with the addition of 1,2-Bis(triethoxysilyl) ethane or 1,2-Bis(Triethoxysilyl)methane having the following chemical structures:

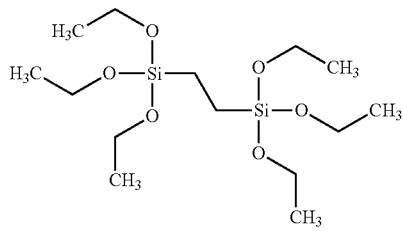

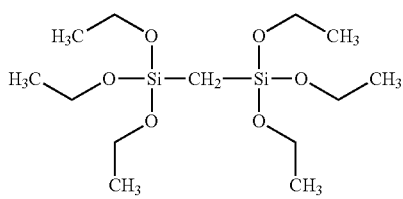

From Doshi et al (Peering into the self assembly of surfactant templated thin film silica mesophases) the novel formation of thin films is attainable as he states "It is now recognized that self-assembly is a powerful synthetic approach to the fabrication of nanostructures with feature sizes smaller than achievable with state of the art lithography and with a complexity approaching that of biological systems". Doshi states "using time-resolved grazing incidence small-angle X-ray scattering (GISAXS) combined with gravimetric analysis and infrared spectroscopy, we structurally and compositionally characterized in situ the evaporation induced self-assembly of a homogeneous silica/surfactant/solvent solution into a highly ordered surfactant-templated mesostructure. Using CTAB (cetyltrimethylammonium bromide) as the structure-directing surfactant, a two-dimensional (2-D) hexagonal thin-film mesophase (p6 mm) with cylinder axes oriented parallel to the substrate surface forms from an incipient lamellar mesophase through a correlated micellar intermediate. Comparison with the corresponding CTAB/water/alcohol system (prepared without silica) shows that, for acidic conditions in which the siloxane condensation rate is minimized, the hydrophilic and nonvolatile silicic acid components replace water maintaining a fluidlike state that avoids kinetic barriers to self-assembly."

By maintaining neutral pH of 6-8 the formulation maximizes condensation polymerization with the incorporation of the Bis(trimethoxysilyl) ethane.

The Polyhexanide salts for use in compositions according to the invention will typically be the protonated form of the following general formula;

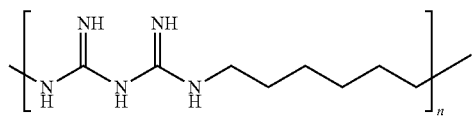

wherein n may have a value of up to about 500 or more, but typically has a value of 1-40, with termination of the polymer chain provided by an appropriate end group (see the Block reference described above). In preferred embodiments of the invention, n has an average value of 10-13; such a cosmetically acceptable Polyhexanide salt is the hydrochloride salt, which can be commercially obtained from Lonza under the trade name Vantocil P. Preferably, the Polyhexanide can be present in compositions according to the invention at a level of 0.01-0.5%, more preferably 0.2-0.1% by weight of the composition, though good results have been found with a level of 0.1-0.5% by weight of Polyhexanide salts in the composition.

In some embodiments, the polymeric biguanide is a compound of formula:

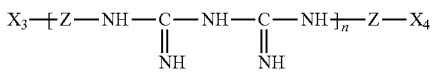

wherein Z is absent or an organic divalent bridging group and each Z may be the same or different throughout the polymer; n is at least 3, preferably 5 to 20 and $X_3$ and $X_4$ are independently selected from —$NH_2$, —NH—C(=NH)—NH—CN, optionally substituted alkyl, optionally substituted cyclo alkyl, optionally substituted aryl, optionally substituted heterocyclyl and optionally substituted heteroaryl; or a pharmaceutically acceptable salt thereof. Preferably, the molecular weight of the polymeric compound is at least 1,000 amu, more preferably between 1,000 amu and 50,000 amu. In a single composition, n may vary providing a mixture of polymeric biguanides.

The above polymeric biguanide compounds and methods for their preparation are described in, for example, U.S. Pat. No. 3,428,576 to East et. al.

The preferred monomeric species is of the formula

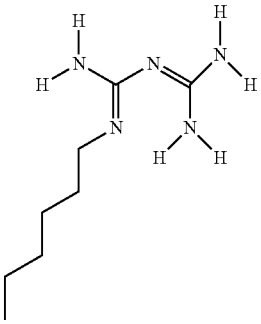

The polymeric biguanide is present in the composition in an amount in the range of 0.1% to 1.5% w/w, especially about 0.1% to about 1.0% w/w, more especially about 0.4% to about 0.6% w/w of the composition.

The polymeric biguanide is one of the most effective *Pseudomonas aeruginosa* biocides in water and active on biofilms of *Pseudomonas*. The Polyhexanide acts as a viable biocide and also as a water-soluble preservative for extended shelf life.

In some embodiments a stabilizer for the polymeric system is added to provide stearic hindrance to the reactive trimethoxysilyl or trihydroxysilyl functional coupling groups. These stabilizer compounds are found to be smectite clays, montmorillonite, kaolin or bentonite clays, gums and sol gels. The water trapped within the clay matrix as shown in FIG. 1 provides for a water bridge at the trihydroxysilyl stability and freeze point reduction.

In another aspect of the present invention, there is provided a suitable active antimicrobial or biocide that is compatible with a carrier to provide the bactericidal active. Benzalkonium chloride exists as a mixture of N,N-dimethyl alkyl amine homologs having the following structure. The benzalkonium antimicrobial agent can have the following structure:

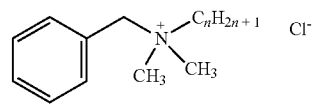

where n=8, 10, 12, 14, 16, 18.

Other quaternary ammonium salts that can be used correspond to the formula:

$$\begin{array}{c} R_1 \quad R_2 \\ \diagdown \overset{+}{N} \diagup \\ \diagup \quad \diagdown \\ R_3 \quad R_4 \end{array} \quad Cl^-$$

wherein $R_1$ is a benzyl group, $R_2$ is a $C_2$-$C_{22}$ alkyl group and $R_3$ and $R_4$ are methyl groups. In one embodiment, the benzalkonium chloride is USP grade, having not less than 40% $C_{12}$, not less than 20% $C_{14}$, and not less than 70% $C_{12}$ and $C_{14}$ homologs combined. In another embodiment, the combination of $C_{12}$ and $C_{14}$ homologs is less than 90%, less than 85%, less than 80%, or less than 75% combined $C_{12}$ and $C_{14}$ homologs. In a further embodiment, the homolog distribution is approximately 67% $C_{12}$, approximately 25% $C_{14}$, approximately 7% $C_{16}$ and approximately 1% $C_{18}$.

The benzalkonium chloride compound is present in an amount in the range of about 0.1% to 3.0% w/w of the composition, especially about 1.0% to about 1.25% w/w, more especially about 1.0% to 1.1% w/w of the composition.

In another embodiment, the monomeric/polymeric carrier and active possess a highly cationic charge or positive charge creating an electromagnetic field or zeta potential that in water effects microorganisms. Since microorganisms have a net negative charge or anionic charge. The combination of the two concentrations of cationic charges and anionic charges allow for a coating of the bacteria and an agglomeration of resident bacteria on the skin into groupings of bacteria that become encapsulated and osmotically and electrochemical face cell lysis. This is extremely advantageous for *Clostridium difficile* spores contamination in hospital and adult care settings.

The present invention provides a secondary carrier system of the active and film former polymer and monomer consisting of a surfactant system which emulsifies any oil to form an oil in water emulsion and wets and treats oil found on the surfaces during application. This invention does clean surfaces. The surfactant package requires non-ionic or amphoteric or zwitterionic systems comprising an alcohol ethoxylate, an alkyl glucoside or alkyl polyglycoside an alcohol EO/PO (ethoxylated/propoxylated) and/or betaine.

In particular embodiments, the alcohol ethoxylate is an alkyl alcohol ethoxylate, with HLB>9.0 for an oil in water emulsion. Biological activity in emulsions is found especially with $C_{12}$-$C_{18}$ alcohol ethoxylate and more especially a $C_{12-15}$ alcohol ethoxylate group. In particular embodiments, the alcohol ethoxylate comprises 6 to 16 ethoxylate groups, especially about 10 to 14 ethoxylate groups. An example of a useful alcohol ethoxylates are Pareth-9 or Isodecyl alcohol EO/PO or Laureth 6 or Polyol 4290.

The alcohol ethoxylate is present in the composition in an amount in the range of 0.1% to 3.0% w/w, especially 0.2 to 2.5% w/w, more especially about 0.25 to 2.0% w/w of the composition.

In particular embodiments, the alkylglucoside or alkylpolyglycoside is a $C_8$-$C_{18}$ alkylglucoside or alkylpolyglycoside, or a mixture thereof. In some embodiments, the alkylglucoside or alkylpolyglycoside is selected from caprylyl glucoside, caprylyl/capryl glucoside, octyl glucoside, decyl glucoside, dodecyl glucoside, coco glucoside, lauryl glucoside, caprylyl polyglycoside, caprylyl/capryl polyglycoside, decyl polyglycoside, dodecyl polyglycoside, coco polyglycoside stearyl polyglucoside, lauryl polyglycoside, pentaerythritol ethoxylate and isodecyl alcohl ethoxylate propo The alkyl glucoside or alkylpolyglycoside is present in the composition in an amount in the range of 0.1% to 0.5% w/w, especially about 0.2 to 0.4% w/w of the composition.

In other embodiments, the composition may also include other optional components such as rheological modifiers, pH adjusters, lubricants, humectants, UV absorbers, fragrances and dyes. Suitable rheological modifiers include smectite clays, hydroxyethyl cellulose, hydroxy-propyl cellulose and Carbopol.

Suitable pH adjusters include buffers, acids and bases. For example, a suitable acidic adjuster is citric acid for pH control at 4-7 and a suitable alkaline adjuster is sodium hydroxide for pH control at 6-8. Other suitable acidic adjusters include benzoic acid, sorbic acid and lactic acid.

In the following examples, 15 formulations were made for testing as both ready to use and concentrates. Several of the formulations were tested in various laboratories around the world under AOAC and ASTM protocols. For Governmental approvals bacteria tested were *E. coli, Staphylococcus aureus* (including MRSA), *Pseudomonas aeruginosa* and *Salmonella enterica*. Some testing depicted in TABLE 4 included hard water at 200 ppm and 5% organic soil loadings at 92% dilutions of the products. All passed the test requirements. The formulations were tested for *Clostridium difficile* spores with two formulations and killed log 4 in 10 minutes.

The formulations were incorporated on a Polyester wipe size 12×12 inches with 30 ml of formulation on the wipe and passed over a glass plate inoculated with *Clostridium difficile* spores. The samples were allowed to air dry for 120 minutes and then sampled. The results showed a log 1.44 kill on the surface. The used wipes were tested after a 24 hour period and showed a log 4.59 kill.

In several of the formulations chemical compounds which are known to germinate spores to include *Bacillus* and *Clostridium* were added in low dosage. The dodecylamine would increase probability of germination while encapsulated in the trialkyloxysilyl quaternaries. The dodecylamine penetrates the spore coatings.

The following examples are intended to demonstrate the usefulness of preferred embodiments of the present invention and should not be considered to limit its scope or applicability in any way.

EXAMPLES

Example 1

Formulations of My Shield Hospital Grade Disinfectant as a Ready to Use Hard Surface Spray Disinfectant

TABLE 1

| CHEMICAL | FORMULA NO-1, WT % | FORMULA NO-2 WT % | FORMULA NO-3 WT % | FORMULA NO-4 WT % | FORMULA NO-5 WT % |
|---|---|---|---|---|---|
| DI WATER | 93.54995 | 93.04895 | 93.04995 | 93.04995 | 93.04895 |
| ODTMSPC[1] | 2.2 | 2.2 | 2.2 | 2.2 | 2.2 |
| ODTHSPCP[2] | — | — | — | — | 0.001 |
| ODTESPC[3] | — | — | — | — | — |
| BARDAC 208M | 1.25 | 1.25 | 1.25 | 1.25 | 1.25 |
| PHMBG[4] | 2.5 | 2.5 | 2.5 | 2.5 | 2.5 |
| GELEST SIB 1817[5] | — | 0.001 | — | — | — |
| GLUCAPON 225 | 0.25 | 0.5 | — | — | — |
| PARETH 9 | 0.25 | 0.5 | — | — | — |
| TOMADOL 900 | — | — | 1.0 | — | — |
| TOMADOL 902 | — | | | 1.0 | |
| EMUGEN HP16 | — | | | | 1.0 |
| POLYOL 4092 | — | | | | |
| EDTA NA | 0.00005 | 0.00005 | 0.00005 | 0.00005 | 0.00005 |
| CITRIC ACID buffer as needed | | | | | |

[1] 1-Octadecanaminium, N,N,Dimethyl-N-[(3-trimethoxysilyl) propyl] chloride = ODTMSPC
[2] 1-Octadecanaminium, N,N,Dimethyl-N-[(3-trihydroxysilyl) propyl] chloride polymer = ODTHSPCP
[3] 1-Octadecanaminium, N,N,Dimethyl-N-[(3-triethoxysilyl) propyl] chloride = ODTESPC
[4] Polymeric biguanide HCL = PHMBG
[5] 1,2-bis(triethoxysilyl)ethane Several formulations were blended into DI water at 50-70 C with high shear mixing technology. Part A The addition of >2.2 wt % (>1.5 wt % active) 1-Octadecanaminium, N,N, Dimethyl-N-[(3-trimethoxysilyl) propyl] chloride (ODTMSPC) and 1-Octadecanaminium, N,N, Dimethyl-N-[(3-triethoxysilyl) propyl] chloride (ODTESPC) are added to 50 C DI water with high shear mixing to dissolve and then requires additions of various surfactants for stable emulsions/dispersions. Part A was added to Part B with the components already in a mixed by a special reactor with side sweep agitation, circulation pump and high shear rotor stator agitator at 50 C. Ph has target range of 5.5-6.5. Adjust with citric acid. Compositions were subjected to quality in process analysis and microbial lab testing.

Example 2

Formulations of My Shield Hospital Grade Disinfectant as a Ready to Use Hard Surface Spray Disinfectant

TABLE 2

| CHEMICAL | FORMULA NO-1, WT % | FORMULA NO-2 WT % | FORMULA NO-3 WT % | FORMULA NO-4 WT % | FORMULA NO-5 WT % |
|---|---|---|---|---|---|
| DI WATER | 92.0495 | 92.0485 | 92.0485 | 92.0495 | 94.5485 |
| ODTMSPC[1] | 2.2 | 2.2 | — | — | 2.2 |
| ODTHSPCP[2] | — | — | — | — | — |
| ODTESPC[3] | — | — | 2.2 | — | — |
| DDTMSPC[5] | — | 0.001 | 0.001 | 2.2 | 0.001 |
| BARDAC 208M | 1.25 | 1.25 | 1.25 | 1.25 | 1.25 |
| PHMBG[4] | 2.5 | 2.5 | 2.5 | 2.5 | — |

TABLE 2-continued

| CHEMICAL | FORMULA NO-1, WT % | FORMULA NO-2 WT % | FORMULA NO-3 WT % | FORMULA NO-4 WT % | FORMULA NO-5 WT % |
|---|---|---|---|---|---|
| EMULGEN HP16 | 2.0 | 2.0 | 2.0 | 2.0 | 2.0 |
| EDTA NA | 0.0005 | 0.0005 | 0.0005 | 0.0005 | 0.0005 |
| CITRIC ACID buffer as needed | | | | | |

[1] 1-Octadecanaminium, N,N,Dimethyl-N-[(3-trimethoxysilyl) propyl] chloride = ODTMSPC
[2] 1-Octadecanaminium, N,N,Dimethyl-N-[(3-trihydroxysilyl) propyl] chloride polymer = ODTHSPCP
[3] 1-Octadecanaminium, N,N,Dimethyl-N-[(3-triethoxysilyl) propyl] chloride = ODTESPC
[4] Polymeric biguanide HCL = PHMBG
[5] 1-Dodecanaminium, N,N Dimethyl-N-[(3-trimethoxylsilyl) propyl] chloride = DDTMSPC Several formulations were blended into DI water at 50-70 C with high shear mixing technology. Part A The addition of >2.2 wt % (>1.5 wt % active) 1-Octadecanaminium, N,N, Dimethyl-N-[(3-trimethoxysilyl) propyl] chloride (OD-TMSPC) and 1-Octadecanaminium, N,N, Dimethyl-N-[(3-triethoxysilyl) propyl] chloride (ODTESPC) are added to 50 C DI water with high shear mixing to dissolve and then requires additions of various surfactants for stable emulsions/dispersions. Part A was added to Part B with the components already in a mixed by a special reactor with side sweep agitation, circulation pump and high shear rotor stator agitator at 50 C. pH has target range of 5.5-6.5. Adjust with citric acid. Compositions were subjected to quality in process analysis and microbial laboratory testing.

Example 3

Formulations of My Shield Hospital Grade Disinfectant 3× Concentrate

TABLE 3

| CHEMICAL | Formula No. 1, Wt % | Formula No. 2 Wt % | Formula No. 3 Wt % | Formula No. 4 Wt % | Formula No. 5 Wt % |
|---|---|---|---|---|---|
| DI Water | 76.145 | 76.144 | 80.394 | 79.145 | 79.394 |
| ODTMSPC[1] | 6.6 | 6.6 | 6.6 | 6.6 | — |
| ODTHSPCP[2] | — | — | — | — | — |
| ODTESPC[3] | — | — | — | — | 6.6 |
| DDTMSPC[5] | — | — | — | — | — |
| ADBAC | — | — | 3.0 | — | — |
| BARDAC 208M | 3.75 | 3.75 | — | 3.75 | 3.5 |
| PHMBG[4] | 7.5 | 7.5 | 7.5 | 7.5 | 7.5 |
| EMULGEN HP16 | 6.0 | 6.0 | — | — | — |
| POLYOL 4290 | — | — | — | 3.0 | 3.0 |
| TOMADLOL 900 | — | — | — | — | — |
| GLUCAPON 425 | — | 1.0 | — | — | — |
| TOMADOL 25-12 | — | 1.5 | — | — | — |
| TRIETHANOLAMINE | — | 0.001 | 0.001 | — | — |
| EDTA N A | 0.005 | 0.005 | 0.005 | 0.005 | 0.005 |
| LAURAMINE | — | — | — | — | 0.001 |

[1] 1-Octadecanaminium, N,N,Dimethyl-N-[(3-trimethoxysilyl) propyl] chloride = ODTMSPC
[2] 1-Octadecanaminium, N,N,Dimethyl-N-[(3-trihydroxysilyl) propyl] chloride polymer = ODTHSPCP
[3] 1-Octadecanaminium, N,N,Dimethyl-N-[(3-triethoxysilyl) propyl] chloride = ODTESPC
[4] Polymeric biguanide HCL = PHMBG
[5] 1-Dodecanaminium, N,N Dimethyl-N-[(3-trimethoxylsilyl) propyl] chloride = DDTMSPC Several formulations were blended into DI water at 50-70 C with high shear mixing technology. Part A The addition of >2.2 wt % (>1.5 wt % active) 1-Octadecanaminium, N,N, Dimethyl-N-[(3-trimethoxysilyl) propyl] chloride (OD-TMSPC) and 1-Octadecanaminium, N,N, Dimethyl-N-[(3-triethoxysilyl) propyl] chloride (ODTESPC) are added to 50 C DI water with high shear mixing to dissolve and then requires additions of various surfactants for stable emulsions/dispersions. Part A was added to Part B with the components already in a mixed by a special reactor with side sweep agitation, circulation pump and high shear rotor stator agitator at 50 C. pH has target range of 6.0-7.0. Adjust with triethanolamine or lauramine. Compositions were subjected to quality in process analysis and microbial laboratory testing.

Example 4

My Shield Hospital Grade Disinfectant 3× Concentrate Formula 1 Table 3 Diluted 3:1 in DI Water Technical Standard for Disinfection (2002 Ministry of Health P.R. China)-2.1.1.7.4 Suspension Quantitative Germicidal Test by Guangdong Detection Center of Microbiology,

TABLE 4

| Sample and time | Tested organism | Test number | CFU of bacteria control | CFU Average in control | CFU in test sample | Log kill | Kill rate % |
|---|---|---|---|---|---|---|---|
| My-shield Formula Ex 1 At 10 min | E coli ATCC 8099 | 1 | $3.0 \times 10^7$ | $3.3 \times 10^7$ | <10 | ≥5.00 | >99.999 |
| | E coli ATCC 8099 | 2 | $3.3 \times 10^7$ | | <10 | ≥5.00 | >99.999 |
| | E coli ATCC 8099 | 3 | $3.5 \times 10^7$ | | <10 | ≥5.00 | >99.999 |
| My shield Formula of Ex 1 At 10 min | Staphylococcus aureus ATCC 6538 | 1 | $4.2 \times 10^7$ | $4.2 \times 10^7$ | <10 | ≥5.00 | >99.999 |
| | Staphylococcus aureus ATCC 6538 | 2 | $3.9 \times 10^7$ | | <10 | ≥5.00 | >99.999 |

TABLE 4-continued

| Sample and time | Tested organism | Test number | CFU of bacteria control | CFU Average in control | CFU in test sample | Log kill | Kill rate % |
|---|---|---|---|---|---|---|---|
| | Staphylococcus aureus ATCC 6538 | 3 | $4.5 \times 10^7$ | | <10 | ≥5.00 | >99.999 |
| My shield Formula of Ex 1 At 10 min | Pseudomonas aeruginosa ATCC 15442 | 1 | $1.2 \times 10^7$ | $1.3 \times 10^7$ | <10 | ≥5.00 | >99.999 |
| | Pseudomonas aeruginosa ATCC 15442 | 2 | $1.4 \times 10^7$ | | <10 | ≥5.00 | >99.999 |
| | Pseudomonas aeruginosa ATCC 15442 | 3 | $1.2 \times 10^7$ | | <10 | ≥5.00 | >99.999 |

Example 5

Aoac 961.0 Germicidal Spray Product as Disinfectants Test Using Formula No 1 on Table 2 My Shield Hospital Grade Disinfectant 3× Concentrate The Quality Assurance Unit has inspected the project no 1514-021418ESC lab #129873-129875 in compliance with 40 CFR Part 160. Accugen Labs Inc
TABLE 5 A: Disinfectant Efficacy Test Results Against *Staphylococcus Aureus* at 200 Ppm
Hard Water, 5% Organic Soil Load and at 92.0% Activity

TABLE 5A

| SAMPLE ID LOT# | ORGANISM | EXPOSURE TIME MIN | # OF TREATED CARRIERS | # OF GROWING CARRIERS | GROWTH RESULTS |
|---|---|---|---|---|---|
| 01187940 | S AUREUS ATTC 6538 | 10 MINUTES | 60 | 01 | 01/60 |
| 01187941 | S AUREUS ATTC 6538 | 10 MINUTES | 60 | 01 | 01/60 |
| 01187942 | S AUREUS ATTC 6538 | 10 MINUTES | 60 | 0 | 00/60 |

Table 5 B: Disinfectant Efficacy Test Results Against *Salmonella Enterica* at 200 Ppm
Hard Water, 5% Organic Soil Load and at 92.0% Activity

TABLE 5B

| SAMPLE ID LOT# | ORGANISM | EXPOSURE TIME MIN | # OF TREATED CARRIERS | # OF GROWING CARRIERS | GROWTH RESULTS |
|---|---|---|---|---|---|
| 01187940 | S ENTERICA ATCC 10708 | 10 MINUTES | 60 | 0 | 0/60 |
| 01187941 | S ENTERICA ATCC 10708 | 10 MINUTES | 60 | 0 | 0/60 |
| 01187942 | S ENTERICA ATCC 10708 | 10 MINUTES | 60 | 0 | 0/60 |

Table 5c: Disinfectant Efficacy Test Results Against *Pseudomonas Aerguinosa* at 200 Ppm Hard Water, 5% Organic Soil Load and at 92.0% Activity

TABLE 5C

| SAMPLE ID LOT# | ORGANISM | EXPOSURE TIME MIN | # OF TREATED CARRIERS | # OF GROWING CARRIERS | GROWTH RESULTS |
|---|---|---|---|---|---|
| 01187940 | P AERUGINOSA ATCC 15442 | 10 MINUTES | 60 | 0 | 0/60 |
| 01187941 | P AERUGINOSA ATCC 15442 | 10 MINUTES | 60 | 0 | 0/60 |
| 01187942 | P AERUGINOSA ATCC 15442 | 10 MINUTES | 60 | 0 | 0/60 |

Example 6

*Clostridium Difficle* Spores—Standard Quantitative Disk Carrier Test Method Astm E 2197 Formulation From Table 3 Number 2

TABLE 6

| TEST ORGANISM | CARRIER # | # SURVIVORS/ TEST CARRIER ($LOG_{10}$) | GEOMETRIC MEAN SURVIVORS OF TEST CARRIERS (AVERAGE $LOG_{10}$ OF TEST CARRIERS) | GEOMETRIC MEAN SURVIVORS OF CONTROL CARRIERS (AVERAGE $LOG_{10}$ OF TEST CARRIERS) | % REDUCTION ($LOG_{10}$ REDUCTION) |
|---|---|---|---|---|---|
| C. DIFFICLE SPORE FORM ATCC 43598 | 1 | $>2.00 \times 10^2$ (>2.30) | $>2.00 \times 10^2$ (>2.30) | $2.45 \times 10^6$ (6.39) | 99.9918% (4.09) |
| | 2 | $>2.00 \times 10^2$ (>2.30) | | | |
| | 3 | $>2.00 \times 10^2$ (>2.30) | | | |
| | 4 | $>2.00 \times 10^2$ (>2.30) | | | |
| | 5 | $>2.00 \times 10^2$ (>2.30) | | | |

Example 7

Custom Sporicidal Efficacy Testing[1] on *Clostridium Difficle* with My Shield Hospital Grade Disinfectant Formulation Table 1 Formulation No 5

TABLE 7

| Test Organism | Test Article And Carrier | Contact Time | Replicate | Cfu/Carrier | Avg Cfu Per Carrier | Avg Log | % Red | Log Red |
|---|---|---|---|---|---|---|---|---|
| C DIFFICLE ENDOSPORES ATCC 43598 | CONTROL ON GLASS CARRIER | TIME ZERO | 1 | $3.55 \times 10^5$ | $3.88 \times 10^5$ | 5.59 | NA | |
| | | | 2 | $3.45 \times 10^5$ | | | | |
| | | | 3 | $4.65 \times 10^5$ | | | | |
| | MY SHIELD ON GLASS CARRIER | 2 HOURS | 1 | $4.00 \times 10^4$ | $1.42 \times 10^4$ | 4.15 | 96.4 | 1.44 |
| | | | 2 | $1.30 \times 10^3$ | | | | |
| | | | 3 | $1.30 \times 10^3$ | | | | |
| | MY SHIELD ON WIPE RECOVERY | 24 HOURS | 1 | $<1.0 \times 10^1$ | $<1.00 \times 10^1$ | <1.0 | 99.99 | >4.59 |
| | | | 2 | $<1.0 \times 10^1$ | | | | |
| | | | 3 | $<1.0 \times 10^1$ | | | | |

1. Vivo Clinical Testing, Austin Texas

Example 8

Astm E2839-11 Protocol for Sporicidal Efficacy Testing of *Clostridium Difficle* with My Shield Hospital Grade Disinfectant Formulation Table 3 Formulation No 3

TABLE 8

| Test Organism | Carrier # | # Survivors/Carrier ($Log_{10}$) | Average Surviors Of Test Carriers | Average Survivors Of Control Carriers | % Reduction (Log Reduction) |
|---|---|---|---|---|---|
| CLOSTRIDIUM DIFFICILE SPORE FORM ATCC 43598 | 1 | >2.00 × $10^2$ (>2.30) | >2.00 × $10^2$ (>2.30) | 2.45 × $10^6$ (6.39) | 99.9918 (4.09) |
| | 2 | >2.00 × $10^2$ (>2.30) | | | |
| | 3 | >2.00 × $10^2$ (>2.30) | | | |
| | 4 | >2.00 × $10^2$ (>2.30) | | | |
| | 5 | >2.00 × $10^2$ (>2.30) | | | |

Example 10

My Shield Hospital Grade Disinfectant 3× Concentrate Formula 1 Table 3 Diluted 4:1 in DI Water Renamed My Shield Mold and Mildew Disinfectant Technical Standard For Disinfection (2002 Ministry Of Health P.R. China)-2.1.1.7.4 Suspension Quantitative Germicidal Test By Guangdong Detection Center Of Microbiology,

TABLE 10

| Sample and time | Tested organism | Test number | CFU of bacteria control | CFU Average in control | CFU in test sample | Log kill | Kill rate % |
|---|---|---|---|---|---|---|---|
| My-shield Formula Ex 1 At 10 min | *E coli* ATCC 8099 | 1 | 3.0 × $10^7$ | 3.3 × $10^7$ | <10 | ≥5.00 | >99.999 |
| | *E coli* ATCC 8099 | 2 | 3.3 × $10^7$ | | <10 | ≥5.00 | >99.999 |
| | *E coli* ATCC 8099 | 3 | 3.5 × $10^7$ | | <10 | ≥5.00 | >99.999 |
| My shield Formula of Ex 1 At 10 min | *Staphylococcus aureus* ATCC 6538 | 1 | 4.2 × $10^7$ | 4.2 × $10^7$ | <10 | ≥5.00 | >99.999 |
| | *Staphylococcus aureus* ATCC 6538 | 2 | 3.9 × $10^7$ | | <10 | ≥5.00 | >99.999 |
| | *Staphylococcus aureus* ATCC 6538 | 3 | 4.5 × $10^7$ | | <10 | ≥5.00 | >99.999 |
| My shield Formula of Ex 1 At 10 min | *Pseudomonas aeruginosa* ATCC 15442 | 1 | 1.2 × $10^7$ | 1.3 × $10^7$ | <10 | ≥5.00 | >99.999 |
| | *Pseudomonas aeruginosa* ATCC 15442 | 2 | 1.4 × $10^7$ | | <10 | ≥5.00 | >99.999 |
| | *Pseudomonas aeruginosa* ATCC 15442 | 3 | 1.2 × $10^7$ | | <10 | ≥5.00 | >99.999 |

The contents of all references cited in the instant specifications and all cited references in each of those references are incorporated in their entirety by reference herein as if those references were denoted in the text While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A composition for inducing and inflicting damage to cell membranes of infectious microorganism by inducing changes in membrane permeability, said composition comprising effective amounts of an alkoxy silyl quaternary ammonium polymer and an alkoxy silyl quaternary ammonium film forming agent; an antimicrobial and antiviral polymeric macromolecule having the formula

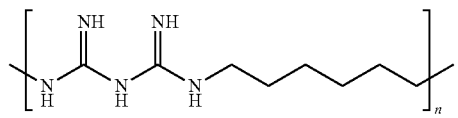

Wherein n is about 500 or more; an antimicrobial molecule; one or more surfactants for micellar dispersions and self assembly properties; a chelating agent, a preservative and optionally a fragrance; and wherein said antimicrobial molecule is selected from the group consisting of: Benzalkonium chloride, 32% Alkyl ($C_{14}$ 50%, $C_{12}$ 40%, $C_{16}$ 10%,) Dimethyl benzyl ammonium chloride, Octyldecyl dimethyl ammonium chloride, Dioctyl dimethyl ammonium chloride, Didecyl dimethyl ammonium chloride and mixtures thereof dissolved in a solvent containing 10% ethyl alcohol and 10% Water.

2. The composition of claim 1, wherein said an alkoxy silyl quaternary ammonium film forming agent is selected from the group consisting of: 1-Octadecanaminium, N, N-dimethyl-N-[(3-trimethoxysilyl)propyl] chloride; 1-Octadecanaminium, N, N-dimethyl-N-[(3-trihydroxysilyl) propyl] chloride polymer; 1-Octadecanaminium, N, N-dimethyl-N-[(3-triethoxysilyl)propyl] chloride and mixtures thereof.

3. The composition of claim 1, further comprising a coupling agent selected from the group consisting of: 1,2-Bis(triethoxysilyl) ethane and 1,2-Bis(Triethoxysilyl)methane and mixtures thereof.

4. The composition of claim 1, wherein said alkoxy silyl quaternary ammonium polymer film forming agent includes Trihydroxysilyl propyl dimethyl octadecyl ammonium polymer and mixtures thereof.

5. The composition of claim 1, wherein said surfactants are selected from the group consisting of: non-ionic surfactants, amphoteric surfactants, zwitterionic surfactants, anionic surfactants and mixtures thereof.

6. The composition of claim 1, wherein said chelating agent is selected from the group consisting of: ethylenediamine-N,N,N',N'-tetraacetic acid (EDTA); monosodium, disodium, trisodium, tetrasodium, dipotassium, tripotassium, dilithium and diammonium salts of EDTA; barium, calcium, cobalt, copper, dysprosium, europium, iron, indium, lanthanum, magnesium, manganese, nickel, samarium, strontium, and zinc chelates of EDTA; trans-1, 2-diaminocyclohexane-N,N,N',N'-tetra-acetic acid monohydrate; N,N-bis(2-hydroxyethyl)glycine; 1,3-diamino-2-hydroxy-propane-N,N,N',N'-tetra-acetic acid; 1,3-diaminopropane-N,N,N',N'-tetraacetic acid; ethylene-diamine-N,N'-diacetic acid; ethylenediamine-N,N'-dipropionic acid dihydrochloride; ethylene-diamine-N,N'-bis(methylenephosphonic acid) hemihydrate; N-(2-hydroxyethyl)ethylenediamine-N,N',N'-triacetic acid; ethylenediamine-N,N,N', N'-tetrakis-(methylenephosponic acid); 0,0'-bis(2-aminoethyl)-ethylene-glycol-N,N, N',N'-tetraacetic acid; N,N-bis(2-hydroxybenzyl)ethylene di-amine-N,N-diacetic acid; 1,6-hexa-methylenediamine-N,N,N',N'-tetraacetic acid; N-(2-hydroxy-ethyl)iminodiacetic acid; imino-diacetic acid; 1,2-di aminopropane-N,N,N',N'-tetraacetic acid; nitrilotriacetic acid; nitrilo-tripropionic acid; the trisodium salt of nitrilotris(methylenephosphoric acid); 7,19,30-trioxa-1,4, 10,13,16,22,27,33-octaazabicyclo [11,11,11]pentatriacontane hexahydrobromide; triethylene-tetramine-N,N,N', N", N''',N''''-hexaacetic acid; deferoxamine; deferiprone; and deferasirox.

7. The composition of claim 1, for use as a bacteriostatic on hard surfaces and on porous surfaces.

8. The composition of claim 1, for use as a hard surface disinfectant.

9. The composition of claim 1, for use as a cleaning sanitizer.

10. The composition of claim 1, for use as a hospital grade disinfectant against viruses, fungi, mold and bacteria.

11. The composition of claim 1, for use against MRSA.

12. The composition of claim 1, for use in killing spores.

13. The composition in claim 1, which attacks microorganisms by polycation adhesion and coats *Clostridium difficile* spores instantly, agglomerates spore bodies and renders cellular necrosis in 10 minutes.

14. The composition of claim 1, wherein said composition dries on surfaces in a minute and via condensation polymerization by water evaporation and by heat forms a polymeric coating.

15. The composition of claim 2, wherein said trialkoxy functional groups from the 1-Octadecanaminium-N,N-dimethyl-N-[3-trimethoxysilyi) propyl] chloride adhere to surfaces and cellular membranes.

16. The composition of claim 3, wherein said composition exhibits adhesion to a substrate.

17. The composition of claim 1, for use in killing bacteria protected by bio films.

* * * * *